(12) United States Patent
Verdier

(10) Patent No.: US 10,520,005 B2
(45) Date of Patent: Dec. 31, 2019

(54) FLOATING NUT

(71) Applicant: LISI AEROSPACE, Paris (FR)

(72) Inventor: Florent Verdier, Rueil Malmaison (FR)

(73) Assignee: LISI AEROSPACE, Paris (FR)

(\*) Notice: Subject to any disclaimer, the term of this patent is extended or adjusted under 35 U.S.C. 154(b) by 220 days.

(21) Appl. No.: 14/910,671

(22) PCT Filed: Aug. 1, 2014

(86) PCT No.: PCT/EP2014/066619
§ 371 (c)(1),
(2) Date: Feb. 5, 2016

(87) PCT Pub. No.: WO2015/018756
PCT Pub. Date: Feb. 12, 2015

(65) Prior Publication Data
US 2016/0186796 A1    Jun. 30, 2016

(30) Foreign Application Priority Data

Aug. 5, 2013 (FR) .................................... 13 57772

(51) Int. Cl.
   *F16B 37/04*         (2006.01)
   *F16B 4/00*          (2006.01)

(52) U.S. Cl.
   CPC ............ *F16B 37/044* (2013.01); *F16B 4/004* (2013.01)

(58) Field of Classification Search
   CPC ................................ F16B 37/044; F16B 4/004
   See application file for complete search history.

(56) References Cited

U.S. PATENT DOCUMENTS

| 4,557,650 A | 12/1985 | Molina |
| 4,732,518 A | 3/1988 | Toosky |
| 2002/0041790 A1 | 4/2002 | Suzuki et al. |
| 2003/0091408 A1 | 5/2003 | Toosky |
| 2004/0202523 A1* | 10/2004 | Csik ...................... F16B 37/043 411/112 |
| 2005/0025606 A1 | 2/2005 | Toosky |
| 2008/0170928 A1* | 7/2008 | Stadler ................... F16B 13/02 411/392 |

FOREIGN PATENT DOCUMENTS

| DE | 102005036110 A1 | 2/2007 |
| FR | 2585786 A1 | 2/1987 |
| GB | 2180905 A | 4/1987 |
| WO | WO 2007/106801 A2 | 9/2007 |
| WO | WO 2008/157265 A1 | 12/2008 |

OTHER PUBLICATIONS

Poll, Andreas, International Search Report, dated Sep. 17, 2014, 4 pages, PCT/ISA European Patent Office.
Poll, Andreas, Written Opinion, published Feb. 12, 2015, 7 pages, European Patent Office.

\* cited by examiner

*Primary Examiner* — John C Hong
(74) *Attorney, Agent, or Firm* — Henricks Slavin LLP

(57) ABSTRACT

A cage nut and a method of installing a cage nut include a nut with a tubular body and a flange, and a nut support having a nut cage for receiving the nut. The nut support includes a tubular portion wherein an external surface of the tubular portion includes longitudinal splines having a diameter smaller than a diameter of a bore of a workpiece, and at least two longitudinal ribs having a diameter greater than the diameter of the bore.

9 Claims, 3 Drawing Sheets

FLOATING NUT

CROSS REFERENCE TO RELATED APPLICATIONS

Figure 1:
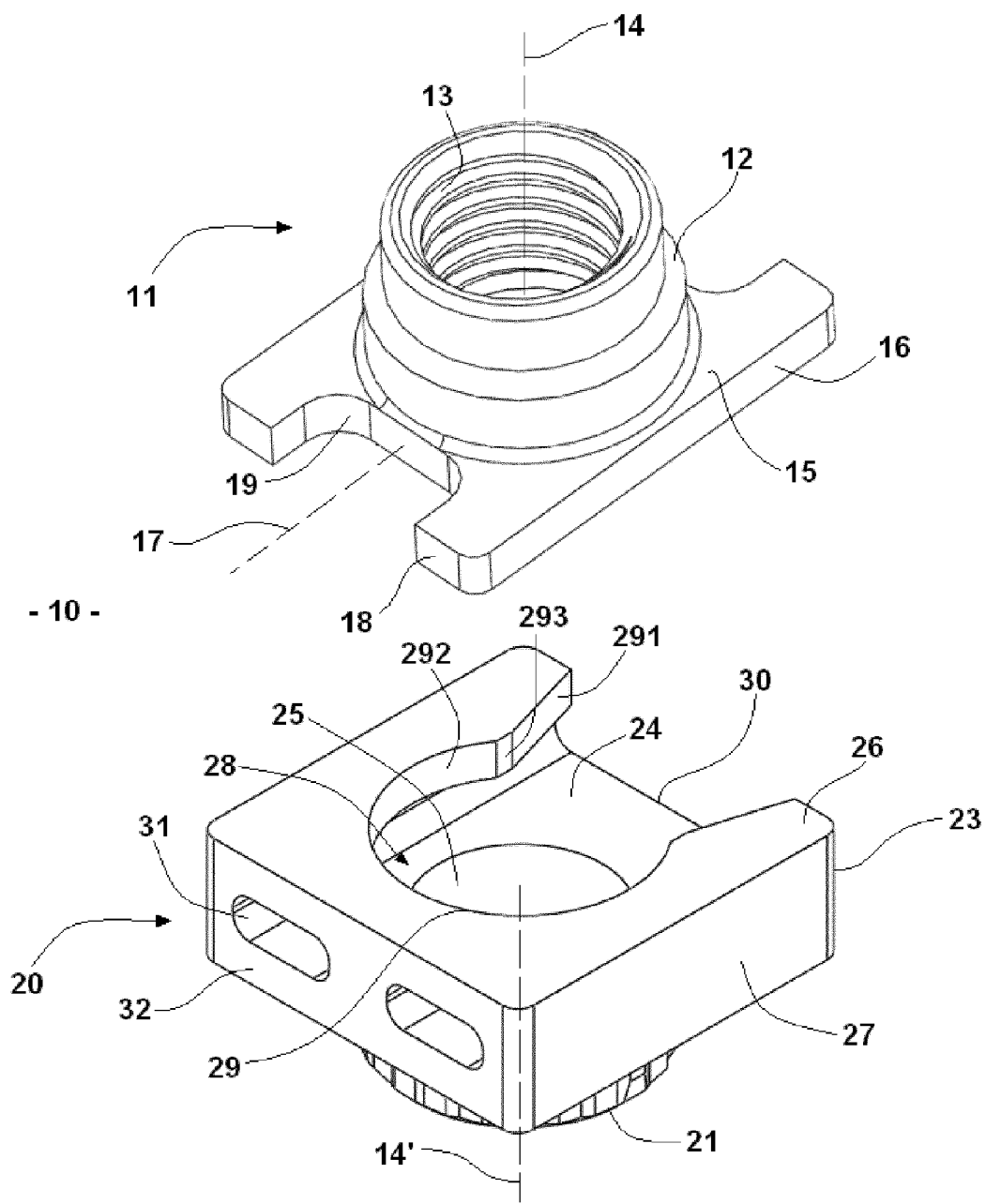

This application is a National Stage of International Application No. PCT/EP2014/066619, filed Aug. 1, 2014, published as WO2015/018756, which claims priority to FR1357772 filed Aug. 5, 2013. The entire contents of the aforementioned applications and publication are incorporated herein by reference.

The present invention relates to a floating nut, or cage nut, device.

Cage nuts are used, for example, in the automobile and aeronautics fields. This type of device comprises in particular a support, secured to a structure at the level of a bore. The support receives a fastening element such as a nut. The nut can function in unison with a threaded rod so as to join the structure to another element. There is clearance between the nut and its support, so as to correct any differences in alignment between the axis of the assembled element and of the bore in the structure containing the nut.

Several examples of cage nuts are described in document WO2008/157265. The nut supports are made in particular of nonmetallic materials, of molded plastic, to reduce the total weight of the device. Such weight savings are generally sought after, especially in the aeronautics field.

The nut supports of document WO2008/157265 are mounted on the structure by fasteners such as solid or blind rivets, or small-sized pin/nut systems. These fasteners, generally metallic, add weight to the overall assembly and require additional holes to be pierced in the structure, which lowers its mechanical resilience and resistance to corrosion. This mode of assembling nut supports also results in a long and complex assembly range and, in the case of rivets, the use of special installation tools. The mode of assembly with rivets is also a problem in the case of composite structures, which do not withstand the crimping of the rivets very well. Similarly, in the case of thick structures, the length-diameter ratio of the holes poses a problem with regard to the piercing, and also sometimes with the availability of suitable rivets.

It would therefore be advantageous to propose a simplified alternative for mounting nut supports on the structure, compatible with thick structures, offering savings in both weight and installation time while also ensuring that the solidity of the assembly is preserved.

The present invention provides a solution to these problems. It relates to a cage nut device comprising: a nut, said nut comprising a tubular body provided with internal tapping, said tubular body extending along a first longitudinal axis, one axial extremity of said body being connected to a flange that is substantially planar and located in a plane orthogonal to the longitudinal axis; the device also comprising a nut support, said support comprising a nut cage, said cage forming an internal housing able to accommodate the nut. The nut support also comprises a tubular portion, said tubular portion extending along a second longitudinal axis from an opening of the base of the nut cage, on a side opposite the internal housing, so that the flange of the nut can be inserted into said internal housing, in an installed position such that the first and second longitudinal axes are aligned. An external surface of the tubular portion of the nut support comprises longitudinal splines having a second diameter smaller than the diameter of the bore, and at least two longitudinal ribs having a third diameter greater than the diameter of the bore.

In this way, the nut support can be mounted on a structure by interference fitting the tubular portion in the bore of said structure. "Interference fitting" refers to a fit with negative clearance. This interference fit is preferably defined such that the nut support can be inserted into the structure manually.

The tubular portion is then permanently secured to the structure by an adhesive being applied over said tubular portion before assembly. The interference fit combined with the presence of splines allows the support to be kept in position in contact with the structure during the adhesive's hardening phase. The longitudinal splines allow a better distribution of the adhesive, and therefore greater solidity of the assembly once the adhesive has hardened.

The interference between the tubular portion and the bore is created by the longitudinal ribs having a third diameter greater than the diameter of the bore. The rest of the external surface of the tubular portion is in contact with the adhesive.

According to one preferred form of the invention, the cage comprises a base and an upper wall, substantially parallel, said base and said side wall being spaced apart from each other and connected by side walls open on at least one side, the upper wall comprising a cut-out opening onto the at least one open side of the side walls, said cut-out being able to radially surround the tubular body of the nut. The cage thus forms an internal housing able to accommodate the nut.

According to one preferred form of the invention, the internal housing of the nut cage and the cut-out of the upper wall are sized such that clearance is retained between said internal housing and the flange, and between said cut-out and the nut body, in a plane orthogonal to the longitudinal axes, so as to correct any differences in alignment when the nut is assembled with a threaded rod.

Preferably, the cage comprises clipping means for keeping the nut in the installed position in the nut support, so as to retain the nut in the cage despite the clearance.

According to another preferred form of the invention, the device has means for rotationally locking, along the longitudinal axes, the nut in the installed position in the support. Preferably the flange of the nut comprises at least two stops located on a proximal edge, and the nut cage comprises a side wall opposite the at least one open side, said side wall comprising openings able to accommodate the stops. These openings and these stops rotationally lock the nut in the support.

Another aspect of the invention relates to an assembly for the installation of a cage nut device, said assembly comprising a cage nut device as described above, as well as a polymerizable viscous adhesive fluid to be deposited in the splines of the tubular portion of the nut support. Preferably, the adhesive is a two-component product, to be mixed just before application onto the nut support and polymerizable at ambient temperature or in an oven.

Another aspect of the invention relates to a method for installing a cage nut device as described above in a structure. Said method comprises the following steps:
- piercing, on a surface of the structure, a bore designed for an interference installation of the tubular portion of the nut support;
- distributing a polymerizable adhesive fluid over the external surface of the tubular body and over one surface of the base of the cage located next to said tubular portion;
- pressing the tubular portion into the bore for an interference installation, until the base of the cage comes into contact with the surface of the structure;
- polymerizing the adhesive.

The cage nut device, installed according to this method, is securely attached to the structure, and the assembly weighs less than one using rivets for fastening, as described in the prior art.

Another aspect of the invention relates to a structure fitted with a cage nut device according to the invention comprising a bore, whose wall has a diameter greater than the second diameter of the longitudinal splines of the tubular portion of the nut support and smaller than the third diameter of the longitudinal ribs of the tubular portion of the nut support, the tubular portion of the nut support being inserted into the bore, as well as a polymerized adhesive placed between said longitudinal splines and the wall of the bore.

Figure 2:
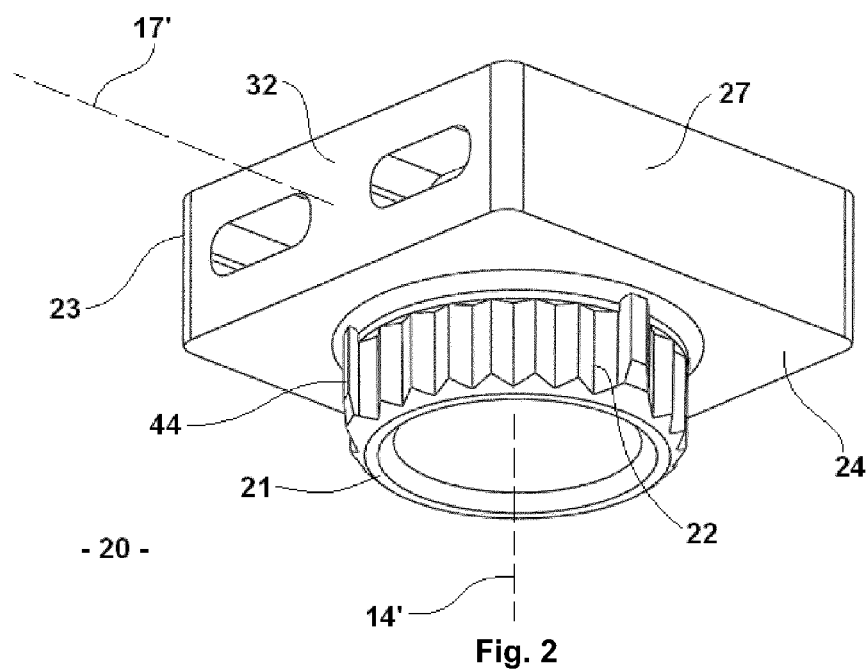
Figure 3:
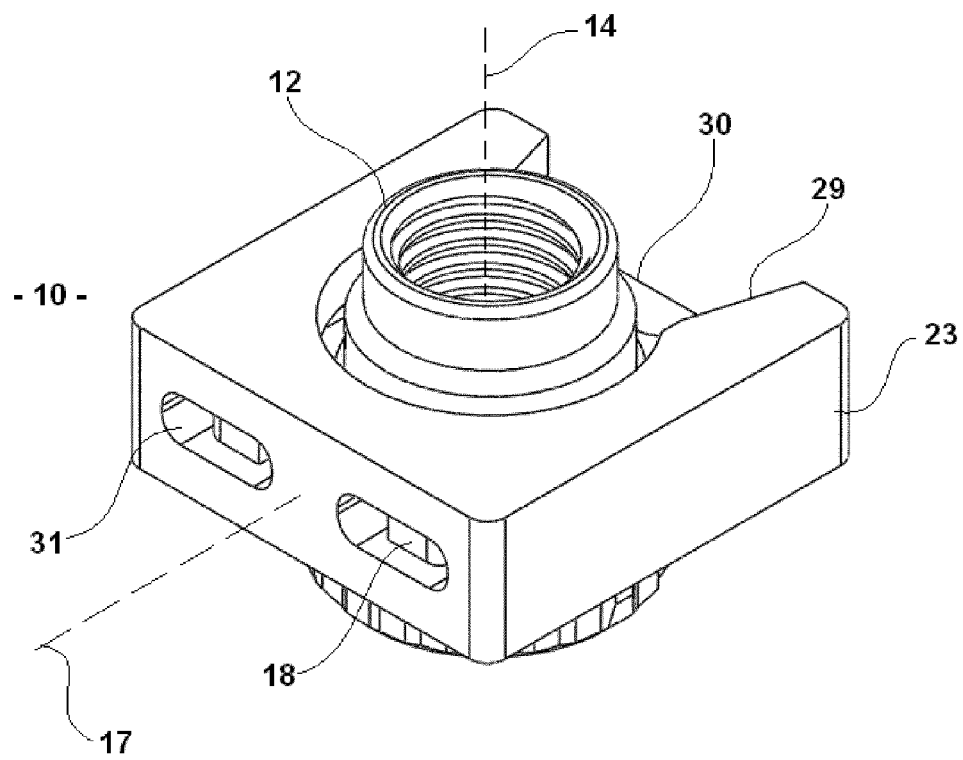
Figure 4:
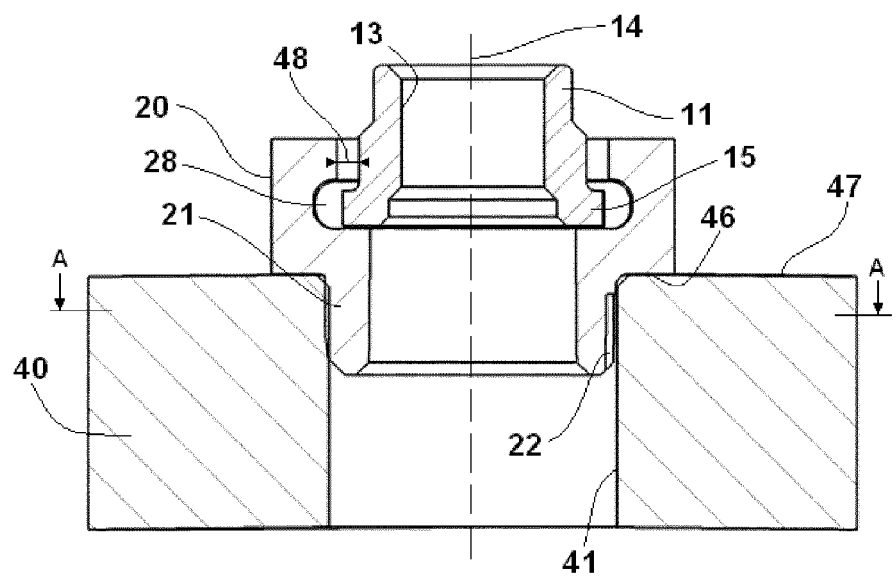
Figure 5:
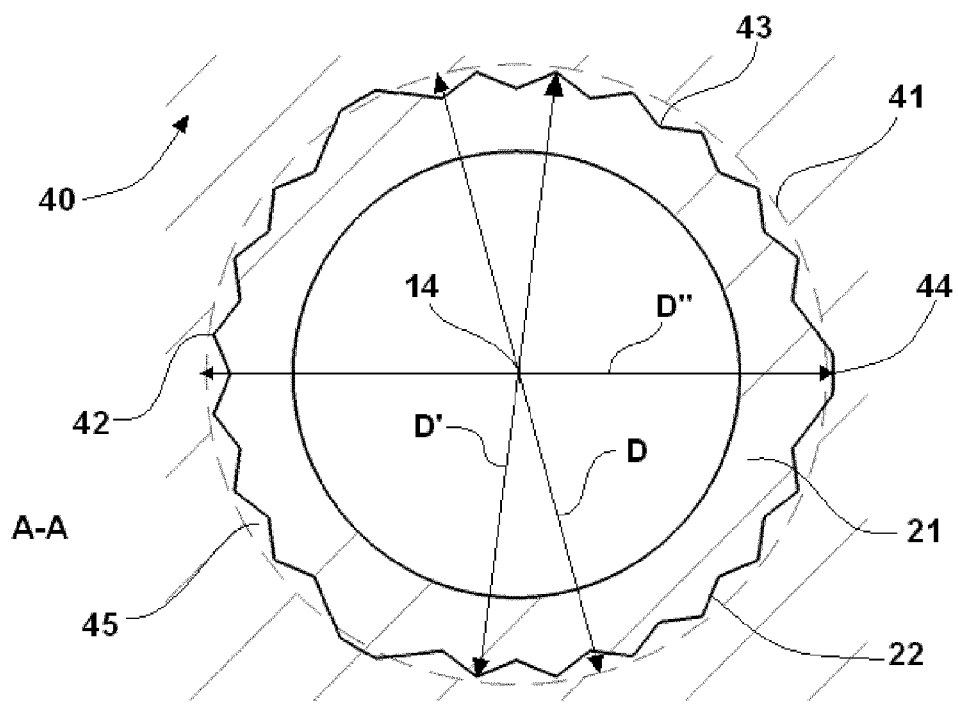

The invention will be better understood in reading the following description and examining the figures pertaining thereto. These are provided for informational purposes only and do not exhaustively define the invention. The figures illustrate the following:

FIG. 1: A perspective view of a device according to one embodiment of the invention, in the separated state;

FIG. 2: another perspective view of an element depicted in FIG. 1;

FIG. 3: a perspective view of the device in FIG. 1, in the assembled state;

FIG. 4: a cross-section view of the device in FIG. 3, assembled to a structure;

FIG. 5: a cross-section view of the device and the structure in FIG. 4.

FIG. 1 depicts an exploded view of a cage nut device 10 according to one embodiment of the invention.

The device 10 comprises a metallic nut 11, said nut 11 comprising a tubular body 12 provided with internal tapping 13. The tubular body 12 extends along a first axis 14.

One axial extremity of the body 12 is connected to a flange 15 substantially located in a plane orthogonal to the axis 14. In the embodiment of the invention, the flange 15 has a substantially rectangular or square shape. The flange 15 comprises in particular two substantially planar edges 16, parallel to axis 14 and extending parallel to a second axis 17, perpendicular to axis 14. Each extremity of an edge 16 is terminated by a stop 18.

The device 10 also comprises a nut support 20. The support 20 is preferably made of a nonmetallic material, particularly a plastic material such as TORLON®.

The support 20 comprises a tubular portion 21 extending along a third axis 14'. The support 20 can also be seen in FIG. 2 according to another cavalier projection. One outer lateral surface of the portion 21 comprises splines 22 parallel to axis 14'.

One axial extremity of the tubular portion 21 is connected to a nut cage 23. The cage 23 comprises a substantially planar base 24, orthogonal to the axis 14'. In the embodiment of the invention, the base 24 has a substantially rectangular or square shape. Said base is pierced by an opening 25 from which the tubular portion 21 extends.

The cage 23 also comprises an upper wall 26, substantially parallel to the base 24 and similar in shape to said base. The base 24 is connected to the upper wall 26 by two substantially planar side walls 27, extending parallel to a fourth axis 17', perpendicular to axis 14'.

The base 24 and the walls (26, 27) form an internal housing 28 sized so as to be able to receive the flange 15 and a portion of the tubular body 12 of the nut 11. FIG. 3 shows the nut 11 mounted on the nut support 20, in a so-called installed position. In this position, the axes 14 and 14' coincide.

The upper wall 26 of the cage 23 comprises a cut-out 29, substantially Ω-shaped. As can be seen in FIG. 1, the Ω shape of the cut-out 29 comprises nonparallel rectilinear edges 291. The edges 291 begin on one side 30 of the cage 23, with no side wall, and come closer to each other in the axis 14' direction, tracing a substantially trapezoidal shape. Each edge 291 is connected to an extremity of another edge 292 with a semi-circular shape and centered on axis 14'. The semi-circular edge 292 is able to radially surround the tubular body 12 of the nut 11.

To assemble the nut 11 and the nut support 20, the flange 15 is placed at the side 30 of the cage 23, such that the axes 17 and 17' coincide. The flange 15 is then translated along the axis 17, sliding on the base 24 such that the edges 16 of the flange and the walls 27 of the cage 23 are substantially parallel.

The junctions 293 of the edges 291 and 292 of the cut-out 29 are separated from each other by a distance equal to or slightly less than one diameter of the corresponding cross-section of the nut body 12. Under the translation force of the nut 11, the walls of the cut-out 29 deform so as to clip around the body 12. Said body 12 is thus surrounded by the edge 292 of the cut-out 29 and retained by the clips 293.

The installed position is achieved when the axes 14 and 14' coincide, i.e. the body 12 of the nut and the tubular portion 21 of the support are aligned, so as to be able to receive a male fastening element, such as a pin.

The dimensions of the flange 15 in the plane orthogonal to axis 14 are slightly smaller than the dimensions of the housing 28 in the same plane. Similarly, the diameter of the circle corresponding to the edge 292 is slightly larger than the diameter of the corresponding cross-section of the nut body 12. For this reason, there is a clearance between the nut 11 and the support 20 in all directions perpendicular to axis 14. This clearance makes it possible to compensate for misalignments when a pin is inserted into the body 12 of the nut and the tubular portion 21 of the support.

When the nut 11 is installed in the support 20, two stops 18 of the flange 15, located on a proximal edge 19, are positioned in openings 31 provided in a third side wall 32 of the cage 23, said wall 32 being opposite edge 30. These openings and these stops make it possible to limit the rotation of the nut 11 in the support 20. However, there is a slight clearance between the openings and the stops, for translation adjustments.

FIG. 4 shows a cross-section view of the device 10 assembled to a structural panel 40. The device 10 can make it possible to connect the panel 40 to another structural element, using a male fastening element such as a threaded pin cooperating with the tapping 13 of the nut 11.

The structural panel 40 has a bore 41 positioned along axis 14. The dimensions of the bore 41 are suitable for interference fitting the tubular portion 21 of the nut support 20.

More specifically, FIG. 5 shows a cross-section view of the panel 40 and the tubular portion 21 along the plane A-A shown in FIG. 4 and orthogonal to axis 14. The wall of the bore 41, of diameter D, is shown by a dashed line.

In the example in FIG. 5, the longitudinal splines 22 of the tubular portion 21 comprise protruding edges 42 and re-entrant edges 43. The protruding edges 42 are located on a single cylinder with a circular base, centered on axis 14, and diameter D' slightly smaller than the diameter of the bore 41. In addition, the outer surface of the tubular portion 21 comprises three longitudinal ribs 44, substantially parallel to edges 42 and 43. Ribs 44 can also be seen in FIG. 2.

The ribs 44 form a slight projection relative to the cylinder formed by the edges 42. The ribs 44 are themselves arranged on a second cylinder with a circular base, centered on axis 14, and diameter D" slightly larger than the diameter of the bore 41. It is the interaction of the ribs 44 with the wall of the bore 41 that allows the tubular portion 21 to be placed in interference with said bore 41. The extremity of the ribs 44 is chamfered so as to allow the centering and facilitate the insertion of the tubular portion in the structure.

According to the invention, it is possible to vary the number of ribs 44, by providing for only two ribs, or for four or five ribs, preferably evenly distributed around axis 14.

Once the portion 21 is interference fitted into the bore 41, a residual space 45 remains between the splines 22 and the wall of said bore. This space 45 receives an adhesive designed to secure the nut support 20 to the panel 40. For example, it is a polymerizable adhesive, in particular with two components that are mixed just before application.

A method for installing the device 10 on the panel 40 comprises for example the following steps: the bore 41 is pierced in the panel 40, with a diameter greater than the diameter of the splines 22 and smaller than the diameter of the ribs 44. Then, a polymerizable adhesive is deposited in the splines 22 of the external surface of the tubular portion 21. The adhesive is also deposited over one surface 46 of the base 24 of the cage, the surface 46 being located next to the tubular portion 21.

The tubular portion 21 is then pressed into the bore for an interference installation because of the negative clearance between the ribs 44 and the diameter D of the bore, until the surface 46 of the base 24 comes into contact with a surface 47 of the panel 40. Maintaining in position during the hardening phase of the adhesive is thus ensured by setting in interference with the structure.

In order to optimize said placing in contact, the bore 41 can be chamfered at the level of the surface 47. The adhesive is then solidified by polymerization, in the open air or by curing.

In this way, one obtains a structure fitted 40 with a cage nut device 10 comprising a bore 41 into which the tubular portion 21 of the nut support is inserted, as well as a polymerized adhesive placed between said longitudinal splines 22 and the wall of the bore.

The panel 40 fitted with the cage nut device 10 can then be assembled to another structural element or panel, by using a pin disposed along the axis 14 traversing this panel or other structural element, and having threading cooperating with the tapping 13. The clearance 48 between the nut 11 and the support 20 allows differences in alignment to be compensated for.

The invention claimed is:

1. Cage nut device designed to be installed in a structure comprising a bore having a first diameter (D), comprising:
    a nut comprising a tubular body provided with internal tapping, said tubular body extending along a first longitudinal axis, and one axial extremity of said body being connected to a flange that is substantially planar and located in a plane orthogonal to the longitudinal axis;
    a nut support comprising a nut cage having a base and forming an internal housing able to accommodate the nut, the support also comprising a tubular portion, said tubular portion extending along a second longitudinal axis from an opening of the base of the nut cage, on a side opposite the internal housing, so that the flange of the nut can be inserted into said internal housing, in an installed position such that the first and second longitudinal axes are aligned,
characterized in that an external surface of the tubular portion of the nut support comprises longitudinal splines having a second diameter (D') smaller than the diameter of the bore to provide a clearance fit with the bore, and at least two longitudinal ribs having a third diameter (D") greater than the diameter (D) of the bore to provide an interference fit with the bore.

2. Device according to claim 1, such that the cage comprises a base and an upper wall, substantially parallel, said base and said upper wall being spaced apart from each other and connected by side walls open on at least one side, the upper wall comprising a cut-out opening onto the at least one open side of the side walls, said cut-out opening being able to radially surround the tubular body of the nut.

3. Device according to claim 2, such that the internal housing of the nut cage and the cut-out of the upper wall are sized such that clearance is retained between said internal housing and the flange, and between said cut-out and the nut body, in a plane orthogonal to the longitudinal axes.

4. Device according to claim 1, such that the device has means for rotationally locking, along the longitudinal axes, the nut in the installed position in the support.

5. Device according to claim 4, such that:
    the flange of the nut comprises at least two stops located on a proximal edge;
    the cage comprises a side wall opposite the at least one open side, said side wall comprising openings able to accommodate the stops.

6. Device according to claim 1, such that the cage comprises clipping means for keeping the nut in the installed position in the nut support.

7. Assembly for the installation of a cage nut device, comprising:
    a cage nut device according to claim 1;
    a polymerizable adhesive fluid intended to be deposited in the splines of the tubular portion of the nut support before the nut cage is inserted in the structure on which it must be mounted.

8. Method for installing a cage nut device, according to claim 1, in a structure, said method comprising the following steps:
    piercing, on a surface of the structure, a bore having a first diameter (D) greater than the second diameter (D') of the splines to provide a clearance fit with the bore and smaller than the third diameter (D") of the ribs of the nut support to provide an interference fit with the bore;
    distributing a polymerizable adhesive fluid over the external surface of the tubular body and over one surface of the base of the nut cage located next to said tubular portion;
    pressing the tubular portion into the bore for an interference installation, until the base of the cage comes into contact with the surface of the structure;
    polymerizing the adhesive.

9. Structure fitted with a cage nut device according to claim 1, characterized in that it comprises a bore, whose wall has a diameter (D) greater than the second diameter (D') of the longitudinal splines of the tubular portion of the nut support and smaller than the third diameter (D") of the longitudinal ribs of the tubular portion of the nut support, the tubular portion of the nut support being inserted into the bore, as well as a polymerized adhesive placed between said longitudinal splines and the wall of the bore.

* * * * *